United States Patent [19]

Henton

[11] Patent Number: 5,001,194

[45] Date of Patent: Mar. 19, 1991

[54] METHOD OF MAKING FUNCTIONALIZED POLYMERIC COMPOSITIONS

[75] Inventor: David E. Henton, Midland, Mich.

[73] Assignee: The Dow Chemical Company, Midland, Mich.

[21] Appl. No.: 376,949

[22] Filed: Jul. 7, 1989

Related U.S. Application Data

[63] Continuation-in-part of Ser. No. 135,424, Dec. 21, 1987, abandoned.

[51] Int. Cl.$^5$ .............................................. C08L 37/00
[52] U.S. Cl. .................................... 525/197; 525/74; 525/75; 525/76; 525/208; 525/218; 525/221; 525/225
[58] Field of Search ............... 525/197, 208, 218, 221, 525/225; 526/318.25

[56] References Cited

U.S. PATENT DOCUMENTS

| | | |
|---|---|---|
| 3,361,842 | 1/1968 | Appelgath et al. |
| 3,658,741 | 4/1972 | Knutson et al. ................. 526/318.25 |
| 3,660,525 | 5/1972 | Kawahara . |
| 3,762,979 | 10/1973 | Hanel et al. |
| 3,770,848 | 11/1973 | Labana et al. ..................... 525/208 |
| 3,852,236 | 12/1974 | Heilman ............................. 525/208 |
| 3,922,421 | 11/1975 | Frank . |

FOREIGN PATENT DOCUMENTS 1353897 10/1970 United Kingdom .

*Primary Examiner*—Jacob Ziegler
*Attorney, Agent, or Firm*—Thomas D. Zindrick

[57] ABSTRACT

A functionalized polymeric composition, said polymeric composition comprising a first phase and a second phase. The first phase comprises a first copolymer of a monovinylidene monomer and a comonomer selected to have at least one reactive epoxide functionality. The second phase is dispersed with the first phase. The second phase comprises a copolymer of an olefin monomer and one or more ethylenically unsaturated monomers copolymerizable with the olefin monomer wherein at least one of the ethylenically unsaturated monomers copolymerizable with the olefin monomer comprises a reactive functionality capable of reacting with one or more of the reactive epoxide functionalities of the first copolymer.

9 Claims, No Drawings

METHOD OF MAKING FUNCTIONALIZED POLYMERIC COMPOSITIONS

CROSS-REFERENCE TO RELATED APPLICATION

This is a continuation in part, of application Serial No. 135,424 filed Dec. 21, 1987, now abandoned.

FIELD OF THE INVENTION

This invention relates to a functionalized polymeric composition comprising two normally incompatible polymers. Specifically, it relates to a polymeric composition having functional groups, said polymeric composition comprising a first phase which comprises a copolymer having a reactive functional group, and a second phase comprising a copolymer having a reactive functionality capable of reacting with the functional groups of the first copolymer, the second phase being dispersed with the first phase.

BACKGROUND OF THE INVENTION

In the preparation of polymeric compositions formed by the blending of a preformed polymer with another preformed polymer, the compatibility of the resulting copolymers is dependent upon the amount of copolymerizable comonomer incorporated into the copolymer matrix. For example, a copolymer of styrene and glycidyl methacrylate (GMA) may be compatible with a preformed polymer, whereas a different copolymer containing a greater amount or different type of comonomer may be incompatible with the same preformed polymer. In the latter event, blending of the preformed polymer and the comonomer does not result in an improved polymeric composition.

As a consequence of the above described problem, manufacturers who desire to blend two normally incompatible polymers generally polymerize the monomers of one polymer in the presence of the preformed second polymer. During this process, chain transfer, or reaction, with the preformed polymer occurs and some of the first polymer is polymerized from a site on the preformed polymer. The prior art technique is limited to preformed polymers which have active hydrogens capable of being extracted by radicals or reactive groups that can copolymerize with the growing polymer. Most polymers can not be used in this process because of the lack of reactivity. This technique also requires that the preformed polymer be soluble or dispersible in a solvent or monomer system suitable for polymerization of the first monomer.

In view of the deficiencies of the prior art, it would be highly desirable to provide functionalized copolymers capable of reacting with a variety of normally incompatible copolymers.

It would be desirable to provide an improved, economical method for preparing the above polymeric composition, particularly for use in blending the copolymers.

Finally, it would be particularly desirable to provide a functionalized polymeric composition having an elastomeric component for use in preparation of impact resistant blends.

SUMMARY OF THE INVENTION

The present invention concerns a polymeric composition which comprises a dispersion of between about 10 and 90 weight percent of a first phase, and between about 10 and 90 weight percent of a second phase, said weight percents being based on the total weight of the polymeric composition;

the first phase comprising a first copolymer being formed from a first monomer mixture which comprises at least 70 weight percent of a monovinylidene monomer, and up to 30 weight percent of a comonomer having at least one reactive epoxide functionality, said weight percents being based on the total weight of the first monomer mixture; and the second phase comprising a second copolymer being formed from a second monomer mixture which comprises at least 20 weight percent of an olefin monomer, and up to 80 weight percent of one or more ethylenically unsaturated monomers copolymerizable with the olefin monomer, wherein at least one of the ethylenically unsaturated monomers copolymerizable with the olefin monomer comprises a reactive functionality capable of reacting with one or more of the reactive epoxide functionalities of the first copolymer, said weight percents being based on the total weight of the second monomer mixture.

Additionally, the present invention concerns a method for making a polymeric composition, the steps of the method which comprises:

(a) providing a first phase in an amount of about 10 and 90 weight percent based on the total weight of the composition, the first phase comprising a first copolymer being formed from a first monomer mixture which comprises at least 70 weight percent of a monovinylidene monomer, and up to 30 weight percent of a comonomer having at least one reactive epoxide functionality, said weight percents being based on the total weight of the first monomer mixture;

(b) providing a second phase in an amount of about 10 and 90 weight percent based on the total weight of the composition, the second phase comprising a second copolymer being formed from a second monomer mixture which comprises at least 20 weight percent of an olefin monomer, and up to 80 weight percent of one or more ethylenically unsaturated monomers copolymerizable with the olefin monomer, wherein at least one of the ethylenically unsaturated monomers copolymerizable with the olefin monomer comprises a reactive functionality capable of reacting with one or more of the reactive epoxide functionalities of the first copolymer, said weight percents being based on the total weight of the second monomer mixture;

(c) dispersing the second phase with the first phase to form an intimate mixture under conditions sufficient to cause the reaction between one or more of the reactive epoxide functionalities of the first copolymer and one or more of the reactive acid functionalities of the second copolymer.

DETAILED DESCRIPTION OF THE INVENTION

The first phase of the polymeric composition of the present invention comprises a first copolymer derived from (a) a monovinylidene monomer and optionally, an ethylenically unsaturated monomer copolymerizable therewith, and (b) a comonomer selected to have at least one reactive epoxide functionality, which epoxide functionality is available for reacting after the first copolymer is formed.

Monovinylidene monomers suitable for use in forming the first copolymer of the present invention are the acrylates and methacrylates of aliphatic alcohols selected from those alcohols having from 1 to 12 carbon atoms, (e.g., methylacrylate, ethylacrylate, methyl methacrylate, butylacrylate, nonylacrylate and the like); monovinylidene aromatic monomers including those polymers based on styrene: α-alkyl monovinylidene monoaromatic compounds (such as α-methylstyrene, α-ethylstyrene, α-methylvinyltoluene, α-methyldialkyl styrene, and the like): ring-substituted alkyl styrenes, (such as ortho-, meta-, and para-vinyltoluene, ortho-ethylstyrene, para-ethylstyrene, 2,4dimethylstyrene, para-tertiary butylstyrene and the like) ring-substituted halostyrenes (such as orthochlorostyrene, para-chlorostyrene, ortho-bromo-styrene, 2,4-dichlorostyrene, and the like): ring-alkyl-, ringhalo-substituted styrenes (such as 2-chloro-4methylstyrene, 2,6-dichloro-4-methylstyrene, and the like): vinylnaphthalene: vinylanthracene: and the like. The alkyl substituents are generally selected to have 1 to 4 carbon atoms and may include isopropyl and isobutyl groups. If desired, mixtures of one or more of such monovinylidene monomers may be used.

The first phase comprises one or more ethylenically unsaturated comonomers selected to have at least one reactive epoxide functionality, said ethylenically unsaturated comonomers being copolymerizable with the monovinylidene monomers. The epoxide functionality is available for reacting after the first copolymer is formed. Suitable epoxy-containing comonomers include the glycidyl acrylates, glycidyl methacrylates, allyl glycidyl ether, and the like. Preferably, the ethylenically unsaturated comonomers copolymerizable with the monovinylidene monomer are selected to have one or more of the reactive epoxide functionalities of the first phase and are selected from the group consisting of glycidyl methacrylate, glycidyl acrylate, allyl glycidyl ether, and mixtures thereof.

In addition to the monovinylidene monomers and the epoxy-containing ethylenically unsaturated comonomers, the balance of the monomer mixture used to form the first phase may additionally comprise minor amounts of suitably copolymerizable monomers which do not adversely affect the properties of the composition. As is known to the skilled artisan, exemplary monomers include the unsaturated nitriles (e.g., acrylonitrile, methacrylonitrile, ethacrylonitrile, etc.); the anhydrides (e.g., maleic anhydride, citraconic anhydride, itaconic anhydride); vinyl halides (e.g., vinyl chloride, vinyl bromide etc.; vinylidene halides (e.g., vinylidene chloride, vinylidene bromide and the like); vinyl esters (e.g., vinyl acetate, vinyl propionate and the like); dialkyl maleate or fumurates (e.g., dimethyl maleate, diethyl maleate, dibutyl maleate, the corresponding fumurates, and the like); and α-olefin monomers having from 1 to 10 carbon atoms (e.g., ethylene, propylene, 1-butene, 1-pentene, 4-methyl-1-pentene, 1-hexene, and 1-octene and the like. A particularly preferred monomer is acrylonitrile. These monomers may be present in an amount of up to 20 weight percent, preferably from up to 10 weight percent, most preferably from up to about 5 weight percent, based on total weight of the monomer mixture used to form the first phase.

The first copolymer which can be employed generally has a melt index as determined by ASTM D-1238 Condition G of between about 0.1 g/10 minutes and about 40 g/10 minutes, preferably between about 0.5 g/10 minutes and about 20 g/10 minutes. The number average molecular weight of the first copolymer as determined by standard gel permeation is generally between about 20,000 and about 150,000, and preferably between about 35,000 and about 90,000. Ordinarily, the first copolymer is selected to have an intrinsic viscosity of between 0.2 and 1 dl/gram at 25° in toluene.

Techniques for polymerizing the first copolymer are well known in the art. The *Kirk-Othmer Encyclopedia of Chemical Technology*. 3rd edition, (1980), which is hereby incorporated by reference, sets forth general polymerization methods.

To improve the impact resistance of the polymeric composition, the first copolymer may advantageously be grafted to rubber substrates, it being understood that such grafting does not bind the reactive epoxide functionality. Suitable rubbery substrate polymers include any polymer or copolymer which are selected to have a glass transition temperature (Tg) of less than about 0° C., preferably not higher than −20° C. as determined by American Society of Testing and Materials (ASTM) test Method D 746-52T.

Graftable rubber substrates suitable for use in the first phase of the present invention may be formed from various elastomeric materials. The elastomeric materials preferred for use in the present invention are diene rubbers, acrylate rubbers, ethylene propylene rubbers, hydrogenated diene rubbers, and EPDM rubbers, or mixtures thereof. A diene rubber is any rubbery polymer of one or more conjugated 1,3-diene, e.g., butadiene, isoprene, piperylene, chloroprene, etc. An acrylate rubber is any rubbery polymer of one or more acrylate monomers, e.g., 2-ethylhexyl acrylate, butylacrylate, etc. An EPDM rubber is an interpolymer formed from ethylene, propylene and one or more dienes.

Such rubbery polymers include homopolymers, interpolymers, and block copolymers of conjugated 1,3-dienes and/or acrylate monomers with up to an equal amount by weight of one or more copolymerizable monoethylenically unsaturated monomers, such as monovinylidene aromatic hydrocarbons (e.q., styrene: a ring-substituted alkylstyrene, such as o-, m-, and p-vinyl toluene, 2,4-diethylstyrene, the ring-substituted ethylstyrenes, p-tert-butylstyrene, etc.; an alpha-alkylstyrene, such as alpha-methylstyrene, alphaethylstyrene, alpha-methyl-p-methylstyrene, etc.; vinyl naphthalene, etc.); ring-substituted halo monovinylidene aromatic hydrocarbons (e.g., the o-, m-, and p-chlorostyrenes, 2,4-dibromostyrene, 2-methyl-4chlorostyrene, etc.); acrylonitrile; methacrylamide, N-butyl acrylamide, etc.); unsaturated ketones (e.g., methyl vinyl ketone, methyl isopropenyl ketone, etc.); alphaolefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

A most preferred group of elastomeric polymers for use in the first phase of the present invention includes those polymers derived from 75 to 100 percent by weight of butadiene and/or isoprene and the balance substantially being one or more of the monomers selected from the group consisting of monovinylidene aromatic hydrocarbons (e.g., styrene) and unsaturated nitriles (e.g., acrylonitrile). Particularly advantageous elastomeric materials for the preparation of the graftable rubber substrates of the present invention are butadiene homopolymers or an interpolymer of 80 to 96 percent by weight butadiene and the balance substantially being acrylonitrile and/or styrene and/or methyl methacrylate.

The graftable rubber substrate suitably is selected to have a volume average particle diameter within the range of from about 300 Angstroms to about 25,000

Angstroms. Preferably, the particles have a diameter within the range of from about 800 Angstroms to about 20,000 Angstroms.

The graftable rubber substrates of the present invention may contain up to about 2 percent of a crosslinking agent based on the weight of the elastomeric polymer-forming monomer or monomers. The cross-linking agent can be any of the agents conventionally used for cross-linking acrylate rubbers and the like. Suitable examples include divinylbenzene, diallyl maleate, diallyl fumurate, diallyl adipate, allyl acrylate, allyl methacrylate, diacrylates, and dimethylacrylates of polyhydric alcohols (e.g., ethylene glycol dimethacrylate, etc.), and the like.

Methods of producing the graftable rubber substrates of the present invention are well-known in the prior art. Typically, the graftable rubber substrates are formed through an emulsion polymerization process, anionic polymerization process, or Ziegler-Nata polymerization process. Exemplary processes are described in *The Kirk-Othmer Encyclopedia of Chemical Technology* at Vol 8, Pages 549–559 and Vol 18, Pages 740–744.

In some applications, it may be desirable to select the graftable rubber substrates to have a broad particle diameter range or which comprise two or more distinct groups having different average particle diameters. For example, it is sometimes desirable to select the graftable rubber substrates to have an average particle diameter within the range of from about 800 Angstroms to about 2000 Angstroms and a second group of graftable rubber substrates having an average particle diameter within the range of from about 4000 Angstroms to about 20,000 Angstroms. The first copolymer is free-radically grafted to the graftable rubber substrate, by processes well-known in the prior art. Examples of known polymerization processes suitable for use in the present invention include mass, mass-solution, mass-suspension, suspension, and emulsion polymerization processes as well as other modifications and/or combinations of such processes. See, for example, U.S. Pat. Nos. 4,430,478 which teach such processes.

Typically, the graft polymerization process involves combining the graftable rubber substrate with the monomers from which the first copolymer is to be formed. The monomers are then polymerized to chemically combine or graft at least a portion of the graft-forming polymer on the graftable rubber substrate.

Those skilled in the art will appreciate the possibility of using a multi-stage graft polymerization process. In such a process, a portion of the first copolymer is formed from a particular monomer mixture and the remainder of the first copolymer is formed from a different monomer mixture. For example, the graftable rubber substrates may have a first layer of a first copolymer grafted thereto. Then, a second layer of first copolymer may be formed wherein the second layer comprises reactive epoxide functionalities capable of reacting with the one or more of the reactive functionalities of the second phase. Through the use of a multi-stage graft polymerization process it is possible to achieve the desirable physical properties of the compositions of the present invention with a relatively small amount of the ethylenically unsaturated monomer having reactive epoxide functionalities.

In many instances the process used to graft the first copolymer onto the graftable rubber substrate inherently produces an amount of free first copolymer, that is, an amount of free first copolymer which is not grafted to the graftable rubber substrate. Generally, the amount of free first copolymer present in the polymeric compositions of the present invention will be within the range of from 1.0 to about 80 weight percent based on total polymeric composition weight. It is to be understood that free first copolymer may be incorporated into the polymeric compositions of the present invention through the above process or by blending the graftable rubber substrate with a separately prepared first polymer.

The graftable rubber substrate has grafted thereto an amount of first copolymer such that the weight ratio of the chemically attached graft to the graftable rubber is within the range of from about 0.05:1 to about 1.5:1 (graft to rubber ratio), beneficially from about 0:1 to about 1.0:1. Preferably, the graft to rubber ratio is from about 0.2:1 to about 0.7:1.

The second phase of the present invention comprises an olefin monomer and one or more ethylenically unsaturated comonomers copolymerizable with the olefin monomer, wherein at least one of the ethylenically unsaturated monomers copolymerizable with the olefin monomer comprises a reactive functionality capable of reacting with one or more of the reactive epoxide functionalities of the first copolymer. The reactive functionality of the second copolymer is available for reacting with one or more of the reactive epoxide functionalities of the first copolymer after the second copolymer is formed.

By "olefin monomer" is meant an aliphatic hydrocarbon having one or more double bonds or mixtures thereof. Preferred monomers include the c-olefin monomers having from 1 to 10 carbon atoms such as ethylene, propylene, 1-butene, 1-pentene, 4-methyl-1pentene, 1-hexene, and 1-octene and the like. Ethylene is particularly preferred.

Exemplary ethylenically unsaturated comonomers copolymerizable with the olefin monomers include mono-basic carboxylic acids or polybasic carboxylic acids and partial esters and amides thereof (e.g., acrylic acid, methacrylic acid, crotonic acid, fumaric acid, maleic acid, itaconic acid, and the like; the corresponding partial esters, e.g., monomethyl fumarate, and the like; and the corresponding partial amides, e.g., fumaric acid, and the like). After polymerization of the olefin monomers and the ethylenically unsaturated comonomers, the reactive functionality of the ethylenically unsaturated comonomer will be available for reacting with the epoxide functionality of the first copolymer.

In addition to the olefin monomer and one or more ethylenically unsaturated comonomers copolymerizable with the olefin monomer, the balance of the monomer mixture used to form the second phase may additionally comprise an amount of suitably copolymerizable monomers which do not adversely affect the properties of the composition. As is known to the skilled artisan, exemplary monomers include carbon monoxide and vinyl acetate. These non-hydrocarbon monomers may be present in an amount of up to 80 weight percent, beneficially up to 50 weight percent, preferably up to about 30 weight percent, based on total weight of the monomer mixture used to form the second phase.

The second copolymer which can be employed generally has a melt index as determined by ASTM-1238 Condition I of between about 0.1 grams/10 minutes and about 100 grams/10 minutes, preferably between about 0.5 and about 75. The number average molecular weight of the second copolymer as determined by standard gel permeation is generally between about 20,000 and about 150,000, and preferably between about 35,000 and about 90,000.

Techniques for polymerizing the second copolymer are well known in the art. The *Kirk-Othmer Encyclopedia of Chemical Technology*, 3rd edition, (1980), which is hereby incorporated by reference, sets forth general polymerization methods.

The second phase of the present invention can be dispersed with the first phase of the present invention through methods well-known in the prior art. Typically, the second phase will be melt blended with the first phase under conditions sufficient to cause the reaction between one or more of the reactive epoxide functionalities of the first copolymer with the one or more reactive functionalities of the second copolymer.

The temperature at which the copolymerization occurs should be effective to melt and mix the polymers, and to induce a reaction. The upper temperature is determined by the thermal stability of the polymers, and the point at which the mixture becomes infusible. The lower temperature is determined by the viscosity of the polymer mixture and the point prior to which the mixture components can react. Preferably, the temperature should be between 177° C. and 316° C., most preferably between about 204° C. and about 274° C.

The shear mixing should be sufficient to provide enough interface between the polymers so that the reaction can occur to form a graft polymer. Exemplary melt processing equipment includes heated two roll compounding mills, Brabender mixers, Banbury mixers, single screw extruders, twin screw extruders, and the like. The melt processing equipment is preferably a twin screw compounder operating between 50 RPM and 500 RPM. Examples of methods suitable for dispersing the second phase with the first phase are melt blending in a Banbury mixer, a Brabender mixer, a single screw extruder, a twin screw extruder, and the like.

An amount of the second phase is dispersed with the first phase such that the first phase comprises from about 10 to about 90 weight percent, and the second phase comprises from about 10 to about 90 weight percent, said weight percents being based on the total weight of the functionalized polymeric composition. Preferably, an amount of the second phase is dispersed with the first phase so that the resultant polymeric composition comprises from about 50 to about 90 weight percent of the first phase and 10 to about 50 weight percent of the second phase. When approximately equal volume levels of first phase and second phase are present, it is possible to have interpenetrating substantially cocontinuous phases.

Applicant has found that the polymeric compositions produced according to the method of the present invention possess improved physical properties when compared to compositions obtained by polymerizing the monomers of either the first or second phases alone, or polymerizing monomers of both the first or second phases where said monomers of either phase do not possess a functionality capable of reacting with a functionality of the other phase. Specifically, the polymeric compositions of the present invention possess an improved combination of impact strength and ductility.

The compositions of the present invention may be blended with thermoplastic resins to achieve modified physical properties. Exemplary thermoplastic resins include polyolefins e.g., ultra-low density polyethylene, medium density polyethylene, high density polyethylene, polypropylene, poly 1-butene: and monovinylidene aromatic polymers e.g., styrene, α-methylstyrene, m-ethylstyrene, p-methoxy-α-methylstyrene, p-ethyl-α-methylstyrene, p-ethyl-α-ethylstyrene, 2,4-diethylstyrene, m-isopropylstyrene and the like. When the thermoplastic resin is a polyolefin, the polyolefin employed will preferably be present in an amount of from about 1 to about 80 percent by weight of polyblend. When the thermoplastic resin is a monovinylidene aromatic polymer, the monovinylidene aromatic polymer employed will preferably be present in an amount of from about 1 to about 30 percent by weight of polyblend.

The compositions of the present invention have a good balance of properties, rendering them suitable for formation into tool housings, automotive parts, sheets, films, containers, and the like. The articles formed from the polymeric composition of the present invention possess a good balance of toughness and ductility, which render them suitable for use in applications previously unavailable to conventional articles.

The following examples are presented to further illustrate but not limit the scope of this invention. All parts and percentages are by weight unless otherwise indicated. Due to rounding and experimental error, the given percentages may not always equal exactly 100 percent.

EXAMPLES AND COMPARATIVE EXAMPLES

Functionalized polymeric compositions are prepared with various components set forth in Table 1.

Each of the polymeric components used in the examples and comparative examples is coded and described hereinafter at Table I.

TABLE I

| Code | Polymer Components<br>Polymer |
| --- | --- |
| S/GMA-1 | A styrene/glycidal methacrylate copolymer having polymerized therein 90 weight percent styrene and 10 weight percent glycidyl methacrylate, said weight percentages being based upon the total weight of the copolymer. The polymerization is carried out as follows: Into a one gallon glass reactor is loaded 1000 g of water, 1.94 g of sodium bicarbonate; 0.48 g of ethylenediaminetetraacetic acid (EDTA 2Na$^+$) and 45.2 g of a polystyrene seed latex, having 13.6 g of polystyrene latex particle of 264 Angstroms (Å). The reactor is purged with nitrogen and heated to 75° C. while being agitated at 150 revolutions per minute (rpm). When the temperature reaches 75° C., the addition of continuous aqueous and monomer streams into the reactor is initiated. The aqueous stream contains 0.32% sodium dodecyl benzene sulfonate (NDBS) soap and 0.21% sodium persulfate and is added at a rate of 153.8 g/hr for 5 hours the monomer stream consists of 90% styrene, 10% glycidyl methacrylate, and 0.20 parts n-octyl mercaptan and is added at a rate of 246.2 g/hour for 5 hours. After completion of the aqueous and monomer addition, the latex is heated for one hour at 75° C., is steam stripped to remove residuals, and is freeze coagulated to isolate the epoxy-containing thermoplastic. The conversion of monomers to polymer is 97.7%. |
| S/GMA-2 | A styrene/glycidyl methacrylate copolymer made similar to S/GMA-1, except that it contains S/GMA in a 90/10 weight ratio. |
| AMS/AN/<br>GMA | A terpolymer of α-methylstyrene/acrylonitrile/glycidyl methacrylate (65/25/10 weight ratio) made similar to S/GMA-1. |
| EAA-1 | An ethylene/acrylic acid copolymer having |

TABLE I-continued

| Code | Polymer Components<br>Polymer |
|---|---|
| | polymerized therein 93.5 percent ethylene and 6.5 percent acrylic acid, both percentages being based upon copolymers weight. The copolymer has a density (ASTM Test D-792) of 0.932 grams per cubic centimeter and a melt index (ASTM Test D-1238) of 5.5 grams per ten minutes. The copolymer is commercially available from The Dow Chemical Company under the trade designation EAA Resin 459. |
| EAA-2 | An ethylene/acrylic acid copolymer having polymerized therein 90.0 percent ethylene and 10.0 percent acrylic acid, both percentages being based upon copolymers weight. The copolymer has a density (ASTM Test D-792) of 0.932 grams per cubic centimeter and a melt index (ASTM Test D-1238) of 5.5 grams per ten minutes. The copolymer is commercially available from The Dow Chemical Company under the trade designation EAA Resin 455. |
| S/GMA-GRC-1 | The polymerization of the grafted copolymer (GRC) is carried out as follows: A relatively small (1400 Angstoms), monodisperse rubber particle is grafted with styrene/glycidyl methacrylate (95/5) in an emulsion process as follows: Into a one gallon glass reactor is placed 1645 g of rubber latex (1400 Angstoms), styrene/butadiene/acrylonitrile (ABS), 5/93/2, 569 g of rubber solids). The reactor is flushed with nitrogen and heated to 90° C. while being agitated at 150 rpm. When the temperature reaches 85° C., two continuous addition (conadd) streams are started. An aqueous stream containing 0.94% sodium dodecyl benzene sulfonate NDBS soap and 0.24% sodium persulfate is added at a rate of 108 g/hour for six hours. A monomer steam containing 95.0% styrene, 5.0% glycidyl methacrylate and 0.05 parts (BOM) n-octyl mercaptan is added at a rate of 51.0 g/hour for six hours. After stopping the conadd streams, the latex is heated an additional 0.25 hours at 90° C., steam stripped to remove residual monomers and stabilized with (⅓) mixture of TOPANOL ® CA, commercially available from Canadian Industries, and dilauryl thiodipropinate (0.2%, based on rubber). The GRC is isolated by freeze coagulation. A grafted rubber concentrate (GRC) of 66.8% styrene/butadiene/acrylonitrile rubber and 33.2% styrene/glycidylmethacrylate S/GMA (95/5) is obtained. The GRC has grafted thereto 43% (weight of grafted phase divided by the weight of rubber × 100) of a styrene/glycidyl methacrylate copolymer having polymerized therein 95 percent styrene and 5 percent glycidyl methacrylate, both percentages being based upon the rigid phase graft copolymer weight. |
| GRC-1 | A grafted rubber concentrate prepared similar to S/GMA-GRC-1, except that it does not contain the epoxy functional monomer. |
| GRC-2 | A grafted rubber concentrate prepared similar to S/GMA-GRC-1, except that in place of styrene/glycidyl methacrylate copolymer (95/5) a styrene/acrylonitrile/glycidyl methacrylate copolymer (66/25.5/8.5 weight ratio) is used. |
| HDPE | A high density polyethylene resin having a density (ASTM Test D-1505) of 0.965 grams per cubic centimeter and a melt index, (ASTM Test D-1238) of 0.8 decigrams per minute. The resin is commercially available from The Dow Chemical Company under the trade designation HDPE 12065. |
| HIPS | A rubber-modified high impact polystyrene, commercially available from The Dow Chemical Company under the trade designation Styron 484. |

PREPARATION OF MOLDED SAMPLES

Molded samples to test the physical properties of the compositions of this invention are prepared as follows Various components from Table I are added to a plastic bag and tumble mixed. More sophisticated equipment could have been used but was not necessary. When the substituents have been thoroughly mixed, they are single passed through an 0.8 inch counter-rotating nonintermeshing twin screw extruder at a feed rate of about 10 lbs/hour while the screws rotate at 200 rpm. The extruder is heated (from back to front) with a temperature profile of 164° C. to 204° C. (from back to front).

The pellets are air dried at 80° C. for several hours before being injection molded. A two-ounce Negri-Bossi reciprocating screw injection molding machine is preheated to 375° F. in zone 1 and 400° F. in zone 2 and the hydraulic injection pressure is 800/600 pounds per square inch with a 45 second cycle time.

Various combinations of the polymer components are prepared into pellets and molded into two tensile bars and two glass chips. The molded articles are subjected to physical property tests, which are described below and footnoted in the respective tables.

[1] Notched Izod Impact Strength measures the toughness of the samples which contain a notch, in foot pounds per inch notch. Notched Izod Impact Strength is determined according to American Society of Testing and Materials Test Method D-256, method A.

[2] Dart impact measures the toughness of the sample in inch pounds. Dart impact is determined using 3.63 kg drop weight and an opening of 3.2 cm on a test specimen having a thickness of 3.175 mm and a Dart of 1.59 cm with a radius of curvature of 0.795 cm.

[3] Tensile yield ($T_y$) measures the yield strength of the sample in pounds per square inch. $T_y$ is determined according to American Society of Testing and Materials Test Method D-638 at 0.2 inches/min.

[4] Tensile rupture ($T_r$) measures the tensile strength upon failure of the sample in pounds per square inch. $T_r$ is determined according to American Society of Testing and Materials Test Method D-638 at 0.2 inches/min.

[5] Modulus ($T_m \times 10^5$) measures the modulus of the sample in pounds per square inch. $T_m \times 10^5$ is determined according to American Society of Testing and Materials Test Method D-638 at 0.2 inches/min.

[6] Percent Elongation (%E) measures the elongation to failure of the sample in percent. %E is determined according to American Society of Testing and Materials Test Method D-638 at 0.2 inches/min.

[7] Vicat measures the heat distortion temperature of the sample in degrees Fahrenheit. Vicat is determined according to American Society of Testing and Materials Test Method D-1525-82.

Results of the physical property tests, where available, are set forth in Table II together with identity and amount of polymer components of each of the respective combinations.

TABLE II
PROPERTIES OF VARIOUS GRAFTS WITH OLEFIN-CARBOXYLIC ACID COPOLYMERS AND STYRENE/GLYCIDAL METHACRYLATE COPOLYMERS

| Example/ Comparative Example | Polymer Code | Component Amount** | Izod Impact[1] | Dart[2] | Ty[3] | Tr[4] | $(T_m \times 10^5)$[5] | % E[6] |
|---|---|---|---|---|---|---|---|---|
| 1* | (1) HIPS<br>(2) E/AA-459<br>(3) GRC 1 | (1) 50<br>(2) 40<br>(3) 10 | 0.3 | <10 | 1220 | 1170 | 0.83 | 3 |
| 2 | (1) S/GmA-1<br>(2) E/AA-459<br>(3) S/GmA GRC-1 | (1) 50<br>(2) 40<br>(3) 10 | 7.2 | 150 | 2540 | 2430 | 0.81 | 44 |

*Not and example of the invention.
**Amounts are in percentages based upon weight of blend
***Not measured.

Blends of these components previously described show an excellent combination of physical properties as seen in Table 2. Specifically, the control samples, lacking functional groups in the first phase, have significantly poorer physical properties than the alloys of the present invention.

various comonomers in the first phase and grafted rubber modifiers possess very desirable physical properties. Specifically, the control samples, lacking functional groups in the first phase, have significantly poorer physical properties than the alloys of the present invention.

TABLE III
PROPERTIES OF VARIOUS GRAFTS WITH OLEFIN-CARBOXYLIC ACID COPOLYMERS AND STYRENE/GLYCIDAL METHACRYLATE COPOLYMERS

| Example/ Comparative Example | Polymer Code | Component Amount** | Izod Impact[1] | Dart[2] | Ty[3] | Tr[4] | $(T_m \times 10^5)$[5] | % E[6] | Vicat (°F.)[7] |
|---|---|---|---|---|---|---|---|---|---|
| 3 | (1) S/GmA-1<br>(2) EAA-1<br>(3) S/GmA-GRC 1 | (1) 50<br>(2) 40<br>(3) 10 | 7.2 | 150 | 2541 | 2432 | 0.81 | 44 | *** |
| 4 | (1) S/GmA-1<br>(2) EAA-2 | (1) 60<br>(2) 40 | 5.1 | 90 | 3330 | 3260 | 1.0 | 24 | *** |
| 5 | (1) AMS/AN/-GMA<br>(2) EAA-2<br>(3) GRC-2 | (1) 50<br>(2) 40<br>(3) 10 | 1.5 | 160 | 2660 | 2490 | 0.88 | 38 | 192 |

*Not an example of the invention.
**Amounts are in percentages based upon weight of blend
***Not measured.

TABLE IV
PROPERTIES OF BLENDS OF FUNCTIONAL POLYMERS WITH NONFUNCTIONAL POLYMERS

| Example/ Comparative Example | Polymer Code | Component Amount** | Izod Impact[1] | Dart[2] | Ty[3] | Tr[4] | $(T_m \times 10^5)$[5] | % E[6] |
|---|---|---|---|---|---|---|---|---|
| 6* | HIPS 484<br>EAA-2<br>S/GmA GRC-1 | (1) 70<br>(2) 20<br>(3) 10 | 0.3 | <20 | 2000 | 1675 | 1.51 | 11 |
| 7* | HIPS 484<br>EAA-1<br>S/GmA GRC-1 | (1) 50<br>(2) 40<br>(3) 10 | 0.3 | <20 | 1060 | 980 | 0.78 | 14 |
| 8 | HIPS 484<br>S/GmA-2<br>EAA-2<br>S/GmA GRC-1 | (1) 10<br>(2) 30<br>(3) 40<br>(4) 20 | 10.4 | 320+ | 2490 | 2440 | 0.72 | 100+ |
| 9 | HDPE<br>EAA-2<br>S/GmA-2<br>S/GmA GRC-1 | (1) 65<br>(2) 10<br>(3) 18<br>(4) 7 | 0.8 | 80 | 2710 | No Break | 1.50 | 250+ |

*Not an example of the invention.
**Amounts are in percentages based upon weight of lend.

Blends of these components previously described show an excellent combination of physical properties as seen in Table III. As can be seen from the above table, compositions according to the present invention having Blends of these components previously described, and mixtures of polyolefins or low levels of additional nonfunctional first phase polymers show an excellent combination of physical properties as seen in Table IV. As can be seen from the above table, compositions according to the present invention possess very desirable physical properties. Specifically, the control samples, having high levels of first phase polymer, have significantly poorer physical properties than the alloys of the present invention.

What is claimed is:

1. A method for making a polymeric composition, the steps of the method which comprise:
   (a) providing a first phase in an amount of about 90 and 10 weight percent and a second phase in an amount of between about 10 to about 90 weight percent, said weight percents being based on the total weight of the polymeric composition,
      the first phase comprising a first copolymer being formed from a first monomer mixture which comprises at least 70 weight percent of a monovinylidene monomer, and up to 30 weight percent of an ethylenically unsaturated comonomer copolymerizable with the monovinylidene monomer and additionally comprising at least one reactive epoxide functionality capable of reacting after the first copolymer is formed, said weight percents being based on the total weight of the first monomer mixture, wherein the first copolymer has a melt index, as determined by ASTM D-1238 Condition G, of between about 0.1 g/10 minutes and about 40 g/10 minutes, and a number average molecular weight, as determined by gel permeation, of between about 20,000 and about 150,000,
      the second phase comprising a second copolymer being formed from a second monomer mixture which comprises at least 20 weight percent of an olefin monomer, and up to 80 weight percent of one or more ethylenically unsaturated monomers copolymerizable with the olefin monomer, wherein at least one of the ethylenically unsaturated monomers copolymerizable with the olefin monomer comprises a reactive functionality after the second copolymer is formed which is capable of reacting with one or more of the reactive epoxide functionalities of the first copolymer, said weight percents being based on the total weight of the second monomer mixture, wherein the second copolymer has a melt index, as determined by ASTM-1238 Condition I, of between about 0.1 grams/10 minutes and about 100 grams/10 minutes and a number average molecular weight, as determined by standard gel permeation, of between about 20,000 and about 150,000,
   (b) dispersing the second phase with the first phase at a temperature of between about 177° C. and 316° C. and under conditions sufficient to form enough interface between the first and second polymers to cause a reaction between one or more of the reactive epoxide functionalities of the first copolymer and one or more of the reactive acid functionalities of the second copolymer.

2. The method of claim 1 wherein the monovinylidene monomer of the first phase is selected from the group consisting of acrylates and methacrylates of aliphatic alcohols having from 1 to 12 carbon atoms, monovinylidene aromatic monomers, α-alkyl monovinylidene monoaromatic compounds, ring-substituted alkyl styrenes, ring-substituted halostyrenes, ring-alkyl, ring-halo-substituted styrenes, vinylnaphthalene and vinylanthracene.

3. The method of claim 1 wherein the ethylenically unsaturated comonomer of the first phase selected to have at least one reactive epoxide functionality capable of reacting after forming the first copolymer, is selected from the group consisting of glycidyl acrylates, glycidyl methacrylates, and allyl glycidyl ether.

4. The method of claim 1 wherein the monomer mixture used to form the first copolymer further comprises up to 20 weight percent, based on the total weight of the monomer mixture, of at least one monomer selected from the group consisting of unsaturated nitriles, the anhydrides, vinyl halides, vinylidene halides, vinyl esters, dialkyl maleates, dialkyl fumurates, and α-olefins having from 1 to 10 carbon atoms.

5. The method of claim 1 wherein the first phase is formed from a first monomer mixture comprising from about 0.1 to about 40 weight percent of the ethylenically unsaturated monomer comprising at least one epoxide functionality, said weight percents being based on the total weight of the first monomer mixture.

6. The method of claim 1 wherein the olefin in the second phase is selected from the group consisting of α-olefin monomers having from 1 to 10 carbon atoms.

7. The method of claim 1 wherein the ethylenically unsaturated monomers being copolymerizable with the olefin monomers and additionally having a reactive functionality capable of reacting with one or more of the reactive epoxide functionalities of the first copolymer is selected from the group consisting of ethylenically unsaturated monobasic carboxlic acids: and polybasic carboxlic acids, and $C_{1-4}$ esters and amides thereof.

8. The method of claim 1 wherein the first phase is present in an amount from about 50 to about 90 weight percent, and the second phase is present in an amount of from about 10 to about 50 weight percent, said weight percent being based on the total weight of the polymeric composition.

9. A method of forming a polymeric composition, the steps of the method which comprises:
   (a) providing a first phase in an amount of about 10 and 90 weight percent and a second phase in an amount of between about 90 and 10 weight percent, said weight percents being based on the total weight of the composition,
      the first phase comprising a first copolymer being formed from a monomer mixture which comprises styrene in an amount of from about 80 to about 99.5 weight percent, and glycidyl methacrylate in an amount of from about 0.5 to about 20 weight percent, based on total monomer mixture weight, wherein the first copolymer has a melt index, as determined by ASTM D-1238 Condition G, of between about 0.1 g/10 minutes and about 40 g/10 minutes, and a number average molecular weight, as determined by gel permeation, of between about 20,000 and about 150,000;
      the second phase comprising a second copolymer of ethylene and a carboxylic acid selected from the group of acrylic acid and methacrylic acid, wherein the carboxylic acid is present in the monomer mixture in an amount of from about 1.0 to about 20 weight percent, based on total monomer mixture weight, wherein the second copolymer has a melt index, as determined by ASTM-1238 Condition I, of between about 0.1 grams/10 minutes and about 100 grams/10 minutes and a number average molecular weight, as determined by standard gel permeation, of between about 20,000 and about 150,000;

(b) dispersing the second phase with the first phase at a temperature of between about 177° C. and 316° C. and under conditions sufficient to form enough interface between the first and second polymers to cause a reaction between one or more of the reactive epoxide functionalities of the first copolymer and one or more of the reactive acid functionalities of the second copolymer.

* * * * *